Oct. 17, 1961
A. S. IRWIN
3,004,803
PILLOW BLOCK
Filed Dec. 3, 1958
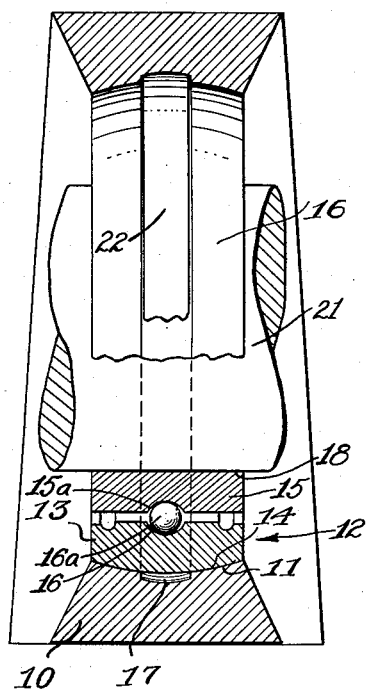
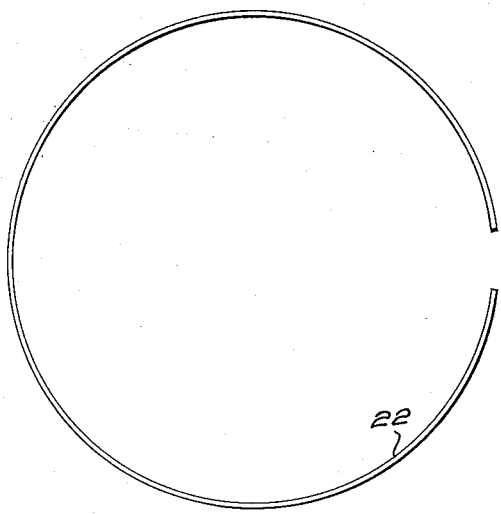
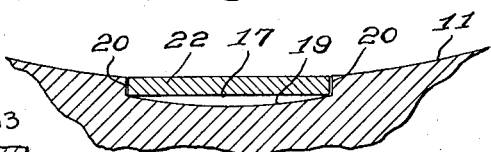
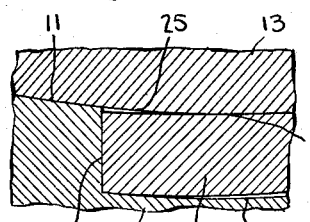
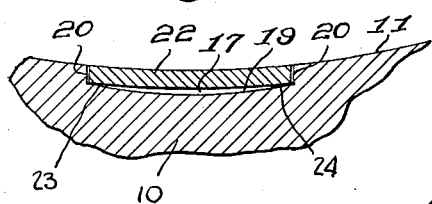
INVENTOR.
ARTHUR S. IRWIN
BY
*Frank A. Bower*
ATTORNEY

3,004,803
PILLOW BLOCK
Arthur S. Irwin, Jamestown, N.Y., assignor to Marlin-Rockwell Corporation, Jamestown, N.Y., a corporation of Delaware
Filed Dec. 3, 1958, Ser. No. 777,986
4 Claims. (Cl. 308—72)

This invention relates to anti-friction bearings and, particularly, to radial bearings.

An object of the invention is to prevent the outer race ring of the bearing from rotation within a bearing supporting member such as a pillow block by taking up the clearance between the two members and thereby eliminating precision grinding and fitting on the engaging surfaces of the bearing supporting member or pillow block and outer race ring surface, and at the same time reducing the cost of fabrication. With this invention provision is made for reducing the clearance or play to an absolute minimum, so that premature failure of the bearing does not result from the pounding that would occur in an average installation, and yet make provision so that the bearing can tilt or shift in the bearing supporting member or pillow block to align with its axis or supporting shaft.

The invention consists of certain novel features of construction and combinations of parts which will be hereinafter set forth in the specification and claims.

In the accompanying drawings,

FIG. 1 is a vertical sectional view of the pillow block and outer race ring with the inner race ring and shaft omitted;

FIG. 2 is a detailed sectional view showing a spring mounted in a groove of the pillow block before the outer race ring is mounted in the pillow block;

FIG. 3 is a similar view illustrating the position assumed by the spring in the groove of the pillow block when the spring is in engagement with the outer race ring;

FIG. 4 is a view in elevation of the spring; and

FIG. 5 illustrates an enlarged fragmentary view of the spring and pillow block groove.

A pillow block 10 supports and retains a ball bearing 12. The pillow block is formed as a ring shaped member having an inner spherical self-aligning surface 11 and received within the pillow block is an annular outer race ring 13. The ring 13 has a spherical outer surface 14 engaging the spherical surface 11 of the pillow block. These spherical surfaces 11 and 14 permit the outer race ring to tilt or shift in the pillow block. The outer race ring of the bearing is provided annularly on its inner surface with a raceway 16 for the anti-friction balls 16a. The inner ring 15 has a raceway 15a and an inner shaft supporting surface 18. The shaft 21 is supported by the ring 15 and engages the surface 18.

The concave spherical surface 11 of the pillow block 10 is provided substantially midway thereof and annularly of the pillow block with a groove 17 having a concave bottom 19 and substantially straight side walls 20. Received in the groove 17 is an annular flat or band type split spring 22 which spring when applied to the pillow block will assume a position such as indicated in FIG. 2, causing the upper surface of the spring to interrupt the spherical curvature of the surface 11 of the pillow block. However, when the outer race ring of the bearing is inserted within the pillow block, the spherical surface 14 of the ring 13 will engage the spherical surface 11 and also the flat surface of the spring 22, forcing the spring 22 into the groove 17 of the pillow block, causing the outer longitudinal edges 23 of the spring to engage the bottom 19 of the groove 17 to hold the spring in a fixed position. The side walls 20 of the groove 17 are of greater depth than the thickness of the spring 22, so that the spring is slightly recessed below the edges of the groove so that the entire circumferential length of said edges is recessed. When the outer race ring of the bearing is fitted into the pillow block, it presses along the center portion of the pillow block and urges the spring into the groove 17 and presses the longitudinal edges 23 of the spring against the bottom 19 of the groove 17 to hold the spring in a fixed position. This stressing action on the spring by the outer race ring exerts a stress on the spring, causing it to be flexed and assume a concaved shape to impinge on the spherical surface of the outer race ring. The outer ring 13 is supported by the concave surface of the pillow block and by the concave central portion of the spring 22 and is clear of any discontinuity created by the groove 17 since the sharp edges of the spring 22 will be spaced from the outer surface of the outer ring 13.

The flat circular shaped spring 22 is fitted in the groove 17 and extends inward of the spherical surface 11 of the pillow block, so that the outer surface of the bearing or ring 13 presses the spring and places it under stress. The stressed spring securely grips the outer race ring so that it cannot rotate, but permits the bearing or outer race ring to align itself with the shaft 21 and permits the shaft bearing to tilt through a range of positions. In this manner, the outer race ring 13 is held against rotation within the pillow block 10 by taking up or reducing the clearance between the pillow block 10 and outer ring 13.

More specifically, the spring 22 preferably has a thickness slightly less than the width of the side walls 20, thus recessing the edges of the spring below the concave surface 11. The full pressure of the contact of the spring against the outer ring 13 occurs along the intermediate area 26 of the surface 25. The spring 22 engages the concave wall 19 along circumferentially extending areas 23 and 24. The friction created by the pressure on the areas 23 and 24 causes the spring 22 to grip the pillow block 10 and prevents rotation of the spring 22 and the outer ring 13. Since roller or ball antifriction elements are used in the bearing, the rotational force applied to the outer ring 13 and to the spring 22 is substantially less than the tilting force applied by the supporting shaft. Thus, the tilting force overcomes the friction between the outer surface of the ring 13 and the area 26 to shift the bearing, yet the bearing is held against rotation.

With this construction and the reducing of the clearance between the pillow block and the outer ring, precision grinding and fitting of the engaging surfaces of the pillow block and outer ring would be eliminated with resultant reduction in cost of fabrication of the bearing. By reducing the play or clearance between the pillow block and the outer ring to an absolute minimum, premature failure of the bearing will not result from the pounding that would occur in an average installation. Furthermore, reducing the clearance by means of the spring 22 will still permit the bearing to tilt or shift in the pillow block and to align with the axis of the bearing or the shaft that may be employed in supporting it.

Although the invention has been described in connection with pillow blocks it is also applicable to bearing supporting members generally as defined in the appended claims.

What is claimed is:

1. In combination with a bearing having an inner shaft supporting surface having an axis coinciding with the axis of a supported shaft and with an exterior convex spherical supporting surface with its locus located in said axis, a bearing supporting member having an inner spherical surface complementary to the exterior convex spherical surface of said bearing and having an intermediate groove extending circumferentially within said bearing supporting member and separating said inner spherical surface into two portions, said exterior convex spherical surface of the bearing engaging said inner spherical surface to tiltedly support said bearing, a circumferentially extending spring member fitting in said groove and having edges recessed in said groove around the entire circumferential length of said edges and an intermediate portion intersecting the extension of the spherical surface of said bearing supporting member in an unflexed position for engagement by the spherical surface of said bearing and flexing into said groove to conform to the spherical surface of the ring member on engagement by the bearing so that the spring member grips the bearing to prevent circumferential rotation while permitting a tilting movement with the locus of the spherical surface of the bearing supporting member remaining on the axis of the inner surface of the bearing through the range of tilted positions thereof.

2. In the combination of said bearing and said bearing supporting member as set forth in claim 1, wherein said spring is flat and engages the bearing over a substantial arc.

3. In the combination of said bearing and said bearing supporting member as set forth in claim 1, wherein said groove is positioned in the middle of the spherical surface of said bearing supporting member to divide said spherical surface into two equal portions.

4. A support for a bearing having an inner shaft supporting surface with an axis coinciding with the axis of a supported shaft and having an exterior convex spherical supporting surface with its locus located in said axis comprising a ring shaped member having an inner spherical surface complementary to a spherical surface of a bearing supported therein for rotatably and tiltedly supporting a bearing, a circumferential groove in said ring shaped member facing inwardly and separating said inner spherical surface into two portions for supporting a bearing on each side of the groove, an annular band type circumferentially extending spring member fitting in said groove with the edges recessed from the spherical surface over the entire circumferential length of the edges and having the center portion of the spring member in a single circular arc and intersecting the extension of the spherical surface for engaging and pressing against the exterior surface of a bearing supported by the two spherical portions on each side thereof and gripping a bearing against circumferential rotation while permitting a bearing to tilt in response to changes in alignment of a shaft supported by a bearing.

References Cited in the file of this patent

UNITED STATES PATENTS

| | | |
|---|---|---|
| 2,073,957 | Brouwer | Mar. 16, 1937 |
| 2,138,659 | Kindig | Nov. 29, 1938 |
| 2,501,100 | Shafer | Mar. 21, 1950 |
| 2,650,866 | Knudson | Sept. 1, 1953 |